United States Patent [19]

Proul

[11] 3,780,978
[45] Dec. 25, 1973

[54] FOOD COOKING FORM

[76] Inventor: Donald W. Proul, 1506 Mariners Dr., Newport Beach, Calif. 92660

[22] Filed: Mar. 27, 1972

[21] Appl. No.: 238,438

[52] U.S. Cl.................... 249/135, 249/55, 249/115, 16/114 R
[51] Int. Cl............................ B28b 7/34, B28b 7/38
[58] Field of Search....................... 249/55, 58, 117, 249/119, 120, 115, 135; 294/7, 8; 16/114

[56] References Cited
UNITED STATES PATENTS

| | | | |
|---|---|---|---|
| 2,497,280 | 2/1950 | Stier | 249/55 |
| 1,350,651 | 8/1920 | Hirst | 249/119 |
| 3,227,066 | 1/1966 | Cady | 249/55 |
| 3,279,936 | 10/1966 | Forestek | 249/115 X |
| 2,666,551 | 1/1954 | Wyman | 16/114 R |
| 2,432,792 | 12/1947 | Ovenshire | 16/114 A |
| 3,667,533 | 6/1972 | Boucher | 164/60 |
| 3,598,169 | 8/1971 | Copley et al. | 164/60 |

FOREIGN PATENTS OR APPLICATIONS

| | | | |
|---|---|---|---|
| 1,007,356 | 10/1965 | Great Britain | 249/174 |

Primary Examiner—Robert D. Baldwin
Assistant Examiner—David S. Safran
Attorney—Harvey C. Nienow et al.

[57] ABSTRACT

The invention provides a form which is used in conjunction with a frypan or grill for cooking foods. By confining eggs or batter or other food to be cooked to the area within the form, food products can be given an interesting and appealing appearance. More than that, however, use of the form permits control of product thickness and provides a food product whose taste and "feel" differ from what that product would have in the absence of the form. The form is made of heat conductive metal, is plastic coated, and has mass and weight so that when used in conjunction with the hot surface of a frypan or grill, food is cooked rapidly at its outer edges and at its bottom to form a shell in which still-liquid portions of the body of foodstuff are contained when the form is lifted away to be used again.

2 Claims, 6 Drawing Figures

PATENTED DEC 25 1973 3,780,978
SHEET 1 OF 2
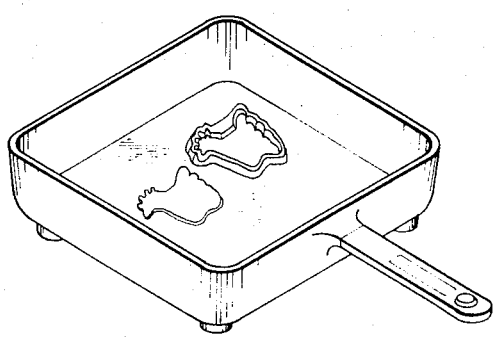
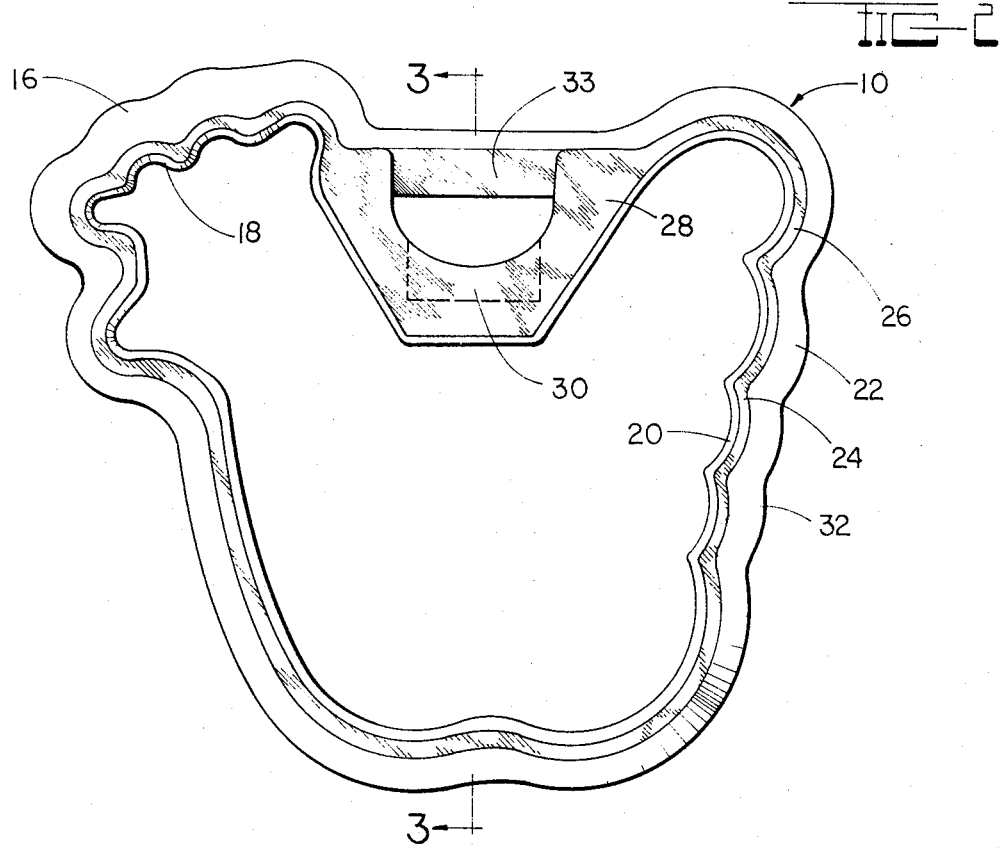
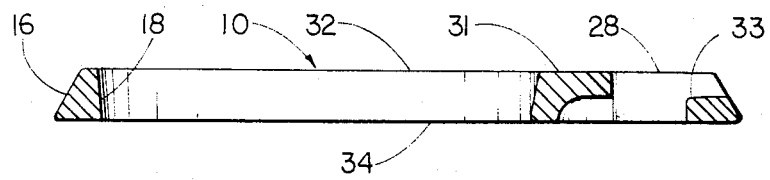

PATENTED DEC 25 1973 3,780,978

FOOD COOKING FORM

This invention relates to improvements in cooking implements. It relates particularly to a food cooking form which is to be used in conjunction with a frypan or cooking plate for the cooking of pourable foods and food mixtures.

The apparatus provided by the invention serves to shape articles of food to make them more appealing or interesting but it serves also to alter the cooking process so that the food product cooked in the apparatus of the invention has a quality somewhat different than it would have in the absence of the invention. It is an object of this invention to provide a single food form that will perform both of those functions. Thus, it is an object to provide a food form which enables the preparation of a food product in a selected shape and to provide that result easily and uniformly without need for additional cooking expertise. Another object is to provide a form in which pourable food preparations, such for example as batters and raw eggs, may be confined while cooking to the end that the food product has greater thickness than it would have at equal temperature if its margins were unconfined and it was allowed to flow freely.

Fried eggs are usually prepared by pouring the raw egg onto the hot surface of a frying pan or grill. The size of the area covered by the egg depends largely upon its temperature and the temperature of the frypan. At low temperatures, the egg white flows outwardly to relatively thin but uniform thickness. In a hotter frypan, the cooked product is likely to be quite thin at its edges and much thicker towards its central regions and the degree in which the egg is cooked is usually substantially less at the center than at the edges. The invention provides a form which serves as a dam. The interior area encompassed by that dam is made sufficiently small, or alternatively a sufficient number of eggs is used, so that the egg whites are precluded from traveling outwardly as far as they would in the absence of that dam. The result is that the thickness of the product is relatively uniform and is greater than it would be in the absence of the form. Eggs prepared in the form look, taste and "feel" like fried eggs. Nonetheless, they are recognizably different from conventionally fried eggs.

Use of the form with a batter has somewhat different meaning. It can, as in the case of the egg, be used to make a thicker end product, but this is significant primarily in the sense that by using it one can achieve the same product thickness with a thinner batter. Thus, the invention makes it possible to avoid thin, flat pancakes and the like when the batter recipe includes substantial proportions of milk or eggs or other liquid ingredients.

The invention provides a form that serves both to confine the food to be cooked and to cook its margins to the end that a "shell" extending across the bottom and up the sides of the body of food is cooked rapidly. That "shell" can serve as container for the remaining, more liquid, body of food material. Having performed that function, the form can be lifted away and used again before the body of food with which it was first used is completely cooked. Because of this feature, a single form can be used in cooking several individual portions of food without waiting for one portion to be completely cooked before beginning to cook another.

The structure provided by the invention performs these several functions by virtue of its shape, weight and thermal characteristics. The form must be a good thermal conductor and must be capable of storing substantial quantities of heat. It is necessary that a liquid food material poured into the form be solidified as soon as it begins to run between the pan and the lower face of the form so that no substantial amount of the food material can run into the space between them. If an appreciable amount of food material can flow under the form, the form will be lifted as the food material cooks and more food material will be able to escape the form. That problem can be solved by such expedients as making the lower face of the form flat and by making the form very heavy. The first of these expedients is employed in the invention. The second is employed only in part. Forms are made heavier by using more material but that costs more to manufacture both for material and for processing.

When the thickness of the form wall is of the order of five thirty-seconds of an inch, then a weight of one-sixth of an ounce per running inch of form length is adequate for confining eggs and pancake batter to a depth of about a quarter of an inch at the lowest temperatures that are normally used in preparing fried eggs and batters. Both iron and aluminum are suitable form materials. Other materials that have suitable physical characteristics are generally too expensive. Either of these two materials are entirely satisfactory when cast. The requirement for draft in sandcasting is not objectionable except that the inner wall at the interior of the form should be nearly perpendicular to the plane of the lower face. That feature is easily incorporated when the form is cut from an extrusion. Partly for this reason and partly because of lower labor cost, the preferred embodiment is made from extruded aluminum.

Two embodiments of the invention are illustrated in the accompanying drawings.

FIG. 1 is an isometric view showing a form of the kind provided by the invention in use in an electrically powered frying pan;

FIG. 2 is a top plan view of the form shown in FIG. 1;

FIG. 3 is a cross-sectional view taken on line 3—3 of FIG. 1;

Figure 4:
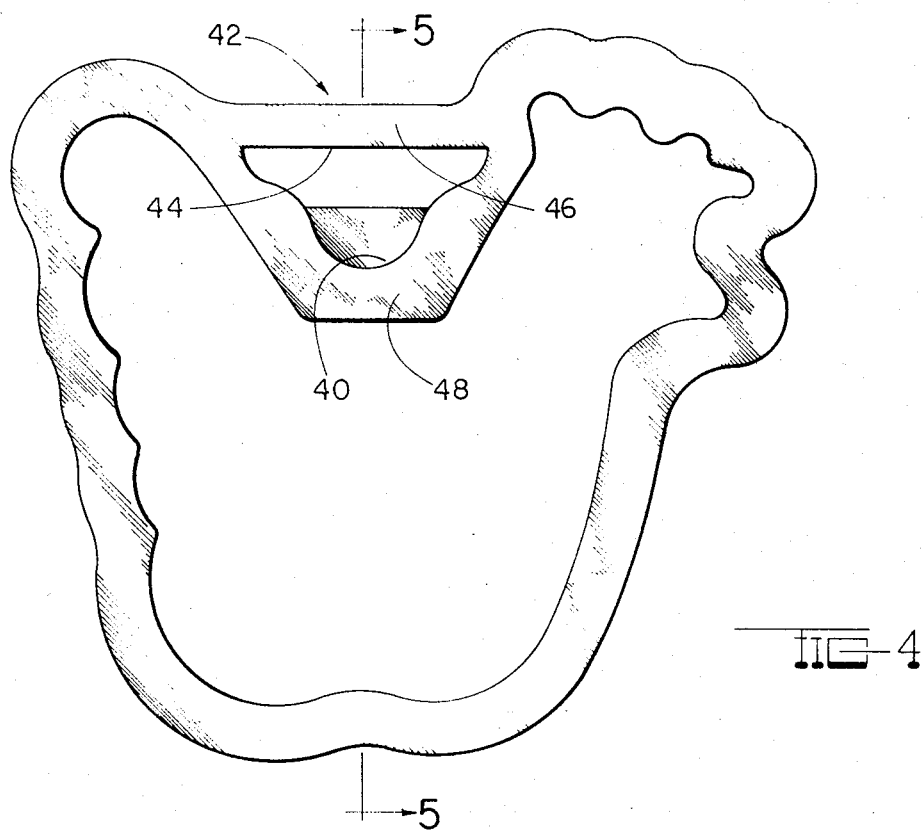
FIG. 4 is a bottom plan view of an alternative form made from an aluminum extrusion.

In each of these embodiments the form extends around an interior area that is shaped to represent a chicken or setting hen. The form shown in FIGS. 2 and 3 is made of cast aluminum coated with a plastic material to which food will not adhere. That layer of plastic is so thin as not to be visible in the drawing. Both embodiments have such a coating made of a material, and applied by a process, selected from the list of materials and processes approved by the Federal Food and Drug Administration. The embodiments shown are coated with the plastic material polytetraflouroethylene. The cast form is cleaned and sprayed with liquid polytetraflouroethylene and cured at approximately 700° Fahrenheit. Any other material and process on the list approved by the Federal Food and Drug Administration may be substituted.

In FIG. 2, the form is generally designated by the numeral 10. It comprises a wall 12 which extends entirely around the periphery of the area in which the foodstuff to be cooked is placed. The dimensions of that wall are important. It must be sufficiently high to contain the food that is to be placed within it and it must have sufficient cross-sectional area so that it can serve as an effective heat sink. Moreover, the cross-sectional area is a measure of the weight of the form and is important for that reason as well. Because one purpose of the form is to add a decorative quality or interesting appearance to the food prepared in it, most forms will define an irregular interior shape. It has been found that the greater the degree of that irregularity, the more need there is to provide an adequate source of heat for rapid cooking at that point. However, when the irregularity becomes extreme in the sense that a narrow extension from the main interior area is defined, then the requirement is reversed. In that circumstance, it is desirable that less heat be stored adjacent to the constructed region lest rapid cooking of food in that region form a restriction preventing food flow entirely into the extension.

The form 10 does not have such an extreme irregularity. The conformations in that form represent tail feathers, the chicken's beak and its comb and are not extreme. The form advantageously has a greater cross-sectional area and can store more heat in the region adjacent to these conformations. This is accomplished simply by "rounding off" the outside upright surface 16 of the form so that instead of following the inward excursions of the inside upright wall 18, the wall is made thicker at these points. To illustrate this feature specifically, attention is invited to the chicken's tail. The inner upright surface 18 makes an inward excursion at point 20 to a shape approaching a point. The outer upright surface 16 at point 22 opposite point 20 does not make a corresponding inward excursion whereby the width of the form at points 20 and 22 is greater than the width of the form just below at point 24 or just above at point 26. Since the mass is greater at points 20 and 22, the heat storage capacity of the form is increased at these points whereby rapid cooking of food engaging the inner surface at point 20 is insured.

The form includes means by which it can be lifted away from the frypan. In this embodiment, that means comprises an enlargement of the wall at one point 28 around its periphery. The enlarged region is provided with special conformations that permit use of a table fork or other implement as the lifting handle. The enlargement is cast with a through opening to the end that a double wall is formed. The inner wall 30 is recessed at its lower side. The tines of the fork fit in that recess. The integrity of that inner wall is preserved adjacent the interior of form so that the inner form surface is continuous as seen at section 31 of the wall. The outer wall 33 is recessed downwardly from the top in the preferred embodiment so that the fulcrum point for the lifting fork is lowered.

It is important that the lower surface 34 lie in a plane and be flat to minimize the possibility that food can flow under the form and lift the form upon being cooked. It is not essential that the upper wall 32 be flat or that it be parallel with the bottom surface. However, since height and cross-sectional area of the form are important, it is convenient in creating the design to make the upper and lower surfaces parallel.

That is especially true when the form is to be made of an extrusion. Using the extrusion process offers a number of advantages, not the least of which is that the interior surface of the form can be made perpendicular to the lower surface. Returning to FIGS. 2 and 3, the cast unit there shown must be provided with a draft so that the finished piece can be removed from the mold. A large draft is provided at the outer surface 16 to facilitate removal. This arrangement is advantageous in that it permits a design in which the lower surface 34 is quite broad. Being broad, the lower surface has greater area of contact with the frypan or hot plate and heating of the form is accelerated. However, the interior surface 18 also has draft. The draft of the inner wall is considerably less than that of the outer wall. Nonetheless, the inner surface slopes outwardly and upwardly and that arrangement does not contribute to easy removal of foodstuffs cooked within the form. On the other hand, the extrusion process permits making the interior surface perpendicular to the lower surface whereby resistance to separation of the food and form is minimized.

Figure 5:
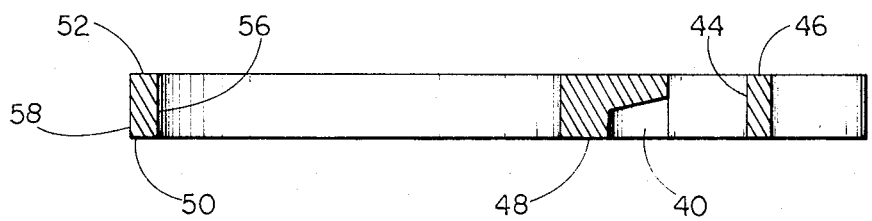
FIG. 5 is a cross-sectional view taken on line 5—5 of FIG. 4.

The bottom view is shown in FIG. 4 so that the recess 40 is visible. The wide point 42 in the form wall is formed with a through opening 44 to form an outer wall 46 and an inner wall 48. The recess 40 is formed in the wall 48 at its lower face and at its side toward the opening 44. The recess is shown more clearly in FIG. 5 where the form has been tipped over so that its bottom surface 50 is downward and its upper surface 52 is above. Thus arranged, a lifting instrument, such as a fork, may be used to lift the form. The tines of the fork are inserted into the opening 44 so that the tines extend into the recess 40. Then lowering the fork handle will bring the back of the tines to rest at the top of wall 46 while their forward and upper parts engage the wall 48.

Except for the lifting provision and the fact that its interior wall 56 and its exterior wall 48 are parallel and perpendicular to the upper and lower surfaces, this form is substantially like the one shown in FIGS. 2 and 3. Like that form, the conformations of the exterior surface of the form are less severe than the conformations at the interior surface to the end that the form is thicker and has more heat storage capacity where the conformations are more extreme.

Figure 6:
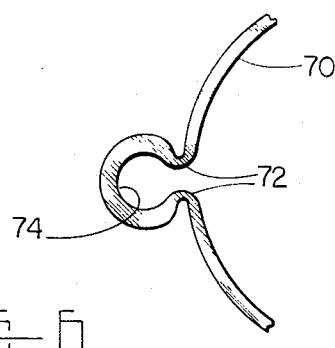
FIG. 6 is a top plan view of a fragment of another embodiment of the invention.

FIG. 6 is a top plan view of a fragment of a form showing the construction when there is an extreme irregularity in the shape of the interior surface. Here the interior surface 7 defines a neck 72 which connects the main interior of the form with a bulbous extension 74. The form is made thinner in the region of the neck so that heat loss to the food being cooked would be more rapid at this point thus to prevent cooking the food sufficiently to close the neck before the egg white or batter or other foodstuff can flow into the bulbous section.

Although I have shown and described certain specific embodiments of my invention, I am fully aware that many modifications thereof are possible. My invention, therefore, is not to be restricted except insofar as is necessitated by the prior art.

I claim:
1. A cooking implement comprising:
   a wall of metal extending continuously around the perimeter of an area whose shape corresponds to the shape desired in a food to be cooked within the wall;
   said wall having a flat lower face lying in a plane and being formed at a point along its length to receive the end of a lifting lever;

said implement having a wall thickness at its lower face not less than five-thirty-seconds of an inch and a height not exceeding one-fourth of an inch;

said implement being made of aluminum and having a weight not less than one-sixth ounces per inch along its length, and being coated with plastic;

the wall at said one point being provided with a through opening extending from its upper to its lower face, the portion thereof that separates said through opening from the interior of said implement being recessed at its lower side over a portion of its width to receive the end of a lifting implement.

2. The invention defined in claim 1 in which the upper and lower faces lie in parallel planes and in which the inner surface of said walls is perpendicular to said planes.

* * * * *